US012618504B2

(12) United States Patent
Dolan, III

(10) Patent No.: US 12,618,504 B2
(45) Date of Patent: May 5, 2026

(54) CONNECTOR FOR SUBSEA PIPELINES AND RISERS, AND REPAIR OF A PIPELINE OR RISER UTILIZING THE CONNECTOR

(71) Applicant: Entagral Engineering, LLC, Houston, TX (US)

(72) Inventor: Lyman J. Dolan, III, Houston, TX (US)

( * ) Notice: Subject to any disclaimer, the term of this patent is extended or adjusted under 35 U.S.C. 154(b) by 415 days.

(21) Appl. No.: 18/264,904

(22) PCT Filed: Feb. 14, 2022

(86) PCT No.: PCT/US2022/016324
§ 371 (c)(1),
(2) Date: Aug. 9, 2023

(87) PCT Pub. No.: WO2022/174148
PCT Pub. Date: Aug. 18, 2022

(65) Prior Publication Data
US 2024/0117914 A1      Apr. 11, 2024

Related U.S. Application Data

(60) Provisional application No. 63/149,307, filed on Feb. 14, 2021.

(51) Int. Cl.
*F16L 55/17* (2006.01)
*E21B 17/08* (2006.01)
(Continued)

(52) U.S. Cl.
CPC ............ *F16L 55/17* (2013.01); *E21B 17/085* (2013.01); *F16L 1/26* (2013.01); *F16L 55/18* (2013.01)

(58) Field of Classification Search
CPC . F16L 1/26; F16L 21/04; F16L 21/045; F16L 21/007; F16L 55/168; F16L 55/163;
(Continued)

(56) References Cited

U.S. PATENT DOCUMENTS 1,163,941 A * 12/1915 Miller ..................... F16L 21/04
277/621
2,197,450 A * 4/1940 Curtis ................... F16L 21/045
277/621
(Continued)

FOREIGN PATENT DOCUMENTS

CA          2435085 A1      1/2004
WO      2020139716 A1      7/2020

OTHER PUBLICATIONS

International Search Report for corresponding PCT/US2022/016324, dated May 3, 2022.
(Continued)

*Primary Examiner* — Aaron M Dunwoody
(74) *Attorney, Agent, or Firm* — Egbert, McDaniel & Swartz, PLLC

(57) ABSTRACT

A connector (30) for pipelines and risers has a body (34) with a packing and scaling (36) is connected thereto. A plurality of elastomeric packing seals (38) are provided between the body (34) and a pipe or riser. A packing and scaling reaction ring (42) is provided at an end of the body (34) opposite the packing/seal flange (36) and abuts the last of the plurality of elastomeric packing seals (38). An outer fastener bolt circle (44) is formed through the packing and sealing flange (36), and fasteners of the outer fastener bolt circle (44) extend through the packing/seal flange (36) into the body (34) of the connector (30). An inner fastener bolt circle (46) is formed through the packing and sealing flange (36), and fasteners of the inner fastener bolt circle extend through passageways of the elastomeric packing seals (38) to be received by the packing/seal reaction ring (42).

20 Claims, 4 Drawing Sheets

(51) Int. Cl.
    *F16L 1/26*         (2006.01)
    *F16L 55/18*       (2006.01)

(58) Field of Classification Search
    CPC ..... F16L 55/17; F16L 55/1705; F16L 55/171;
          F16L 55/1715; F16L 55/18; F16L
          55/1608; E21B 17/085
    USPC ...................................................... 138/98, 99
    See application file for complete search history.

(56)           References Cited

U.S. PATENT DOCUMENTS

| | | | | |
|---|---|---|---|---|
| 2,258,135 | A * | 10/1941 | Curtis | F16L 21/045 |
| | | | | 285/379 |
| 2,647,769 | A * | 8/1953 | Smith | F16L 21/045 |
| | | | | 277/621 |
| 2,721,581 | A * | 10/1955 | Risley | F16L 21/045 |
| | | | | 219/161 |
| 2,937,038 | A * | 5/1960 | Gondek | F16L 19/086 |
| | | | | 285/123.6 |
| 4,006,921 | A | 2/1977 | Mohr | |
| 4,127,289 | A * | 11/1978 | Daspit | F16L 21/08 |
| | | | | 285/348 |
| 4,621,844 | A * | 11/1986 | Kipp | F16L 1/26 |
| | | | | 285/381.3 |
| 4,699,405 | A * | 10/1987 | Miller | F16L 21/007 |
| | | | | 285/341 |
| 4,753,461 | A * | 6/1988 | Miller | F16L 21/007 |
| | | | | 285/341 |
| 4,832,379 | A | 5/1989 | Smith et al. | |
| 5,074,712 | A | 12/1991 | Baugh | |
| 5,437,482 | A | 8/1995 | Curtis | |
| 5,727,793 | A * | 3/1998 | Gosselin | F16J 15/184 |
| | | | | 277/308 |
| 5,899,507 | A | 5/1999 | Schroeder et al. | |
| 6,305,719 | B1 | 10/2001 | Smith et al. | |
| 9,303,803 | B2 * | 4/2016 | Gifford | F16L 37/0927 |
| 9,593,793 | B2 | 3/2017 | Benson | |
| 10,711,919 | B2 * | 7/2020 | Fowkes | B29C 63/024 |
| 2009/0127849 | A1 * | 5/2009 | Kim | F16L 21/08 |
| | | | | 285/136.1 |
| 2010/0090150 | A1 * | 4/2010 | Readman | F16L 37/35 |
| | | | | 251/336 |
| 2011/0023975 | A1 | 2/2011 | Clark et al. | |
| 2017/0030505 | A1 * | 2/2017 | Bowie | F16L 21/007 |
| 2018/0259110 | A1 | 9/2018 | Mancier et al. | |
| 2019/0219210 | A1 | 7/2019 | Louden et al. | |
| 2019/0316725 | A1 * | 10/2019 | McGarian | F16L 21/04 |
| 2024/0117914 | A1 * | 4/2024 | Dolan, III | F16L 55/17 |

OTHER PUBLICATIONS

Written Opinion for corresponding PCT/US2022/016324, dated May 3, 2022.

* cited by examiner

CONNECTOR FOR SUBSEA PIPELINES AND RISERS, AND REPAIR OF A PIPELINE OR RISER UTILIZING THE CONNECTOR

FIELD OF THE INVENTION

The present invention relates to connectors for subsea pipelines and risers, more particularly connections which may be used in the repair of subsea pipelines or risers.

BACKGROUND OF THE INVENTION

Subsea pipeline fittings (i.e. connectors and repair products) have been in existence since the late 1960's. They are typically installed horizontally subsea and can be either sleeved or split. Pipeline fittings are also installed in vertical application such as on risers.

Various patents have issued in the past relating to the repair of pipelines and risers. For example, U.S. Pat. No. 7,472,722 (the '722 patent) issued on Jan. 6, 2009 to Nadarajah et al. The '722 patent describes a method of preparing a pipeline section using a combination of a wrap and sleeve structure. Particularly, the pipe is grit-blasted and then wrapped with the fiber composite material. Two half sleeves are then installed over the fiber-reinforced composite material, and an epoxy or cement grout or combination thereof is injected into the sleeves through an inlet port. Once the injected material is allowed to cure, the ends of the sleeves are sealed using a pair of flanges.

U.S. Pat. No. 10,711,919 (the '919 patent), issued on Jul. 14, 2020 to Fowkes. The '919 patent describes repair or coating of subsea pipelines. In particular, the repair according to the '919 patent includes a wrap tape cassette with a drum for carrying a wrap tape wound thereon. A housing is provided which defines an exit opening for the wrap tape, and the drum moves rotationally and longitudinally relative to the housing to dispense the wrap tape around the pipeline.

U.S. Pat. No. 9,593,793 (the '793 patent), issued on Mar. 14, 2017 to Benson et al. The '793 patent discloses pipeline repair utilizing a chain clamp structure. Specifically, the '793 patent discloses a repair system with one or more machinable link sections which function as chain clamps to repair the pipeline while it is still in service. The sections can comprise interlocking sections similar to conventional bend limiter sections, or which may be locked in place using bolts or other fasteners.

U.S. Pat. No. 5,074,712 (the '712 patent), issued on Dec. 24, 1991 to Baugh. The '712 patent describes the remote repair of subsea pipelines, which utilizes two split clamping halves and sealing means installed around the pipeline in a programed fashion. The system of the '712 patent is directed to areas which require low clearance the below the pipeline.

Canadian Patent No. 2435085 (the '085 patent) describes a pipe repair using compressive devices. In the method of pipe repair of the '085 patent, first and second split sleeves are applied to the pipe section, and a compressive force is supplied until the inner diameter of the pipe experiences compressive sheer hoop strain.

U.S. Pat. No. 6,305,719 (the '719 patent), issued on Oct. 23, 2001 to Smith et al. The '719 patent describes a type of pipe repair clamp. In particular, the '719 patent describes opposing shell members which are bolted together. An annular channel is formed between a ring assembly and the damaged pipe member. The annular channel can be used to receive a liquid sealant so as to repair the pipe.

International Publication No. WO2020/139716 describes a slip-on type pipeline repair connector. In particular, this publication describes the use of graphite packers within the connector.

As noted before, risers are vertical conduits for carrying hydrocarbons from the ocean floor to the rig or other structure at the surface. As the risers approach the rig from the seafloor, they extend through an underwater zone, and into a tidal zone. The tidal zone represents an area between the mean low tide and the mean high tide. Between the tidal zone and the topsides of the rig is an area known as the splash zone. The splash zone presents many challenges, including challenges related to corrosion. Metal surfaces in the splash zone are alternately being wetted and dried. The saltwater and exposure to oxygen is extremely corrosive, and waves also have a corrosive effect on the metal surfaces. Corrosion protection measures which are effective for constantly-submerged surfaces are not effective in the splash zone, and neither are corrosion protection measures designed for surfaces which are only exposed to the atmosphere. While special measures can be taken, structures such as risers in the splash zone are subject to excessive corrosion and frequent repair.

Referring to FIG. 1, there shown a conventional pipeline connector. The connector 12 can be used in a repair application or a connection application. The connector 12 is mounted on the outer diameter of a pipeline or riser 10. The connector 12 has a body 14. A packing and sealing flange 16 is illustrated as being connected to the body 14. Transverse fasteners 17 are used to secure two halves of the packing and sealing flange 16, or are welded for split sleeve riser repair, in the event of a split configuration. A fastener bolt circle has a plurality of fasteners 18 which extend through to the body 14. The fastener bolt circle extends around the circumference of the packing and sealing flange 16. A plurality of elastomeric packer seals 20 is provided between the body 14 and the outer diameter of the pipe or riser 10. Centrally of a pair of the plurality of elastomeric packer seals 20 is an annulus pressure test ring 22. A pressure test port 24 is provided through the body 14 so as to ensure that the seal has been created about the pipe 10 and body 14.

A shoulder member 26 is provided at an end of the connector 12 opposite the packing and sealing flange 16. The shoulder member 26 may be angled as it engages the shoulder 28 of the body 14.

The plurality of fasteners 18 are intensified using various methods. As such, the packing and sealing flanged 16 strokes forward and pushes against the plurality of elastomeric packing seals 20. The packing and sealing flange 16 reacts against these seals 20 and sets them. The fastener load for the fasteners of the fastener bolt circle is calculated to create a predictable pressure in the packing seals 20 which exceeds the pipe pressure.

While FIG. 1 illustrates a single pressure test port 24, typically there are two pressure ports. Annulus pressure test ring 22 has two communication holes set 180° apart to validate the seal at the inner diameter of the body 14 and at the outer diameter of the pipe 10.

As noted before, risers in the splash zone encounter excessive corrosion. As such, oftentimes temporary solutions and repairs are made in response to issues in the splashdown, prior to more permanent solution involving, such as those involving connectors as illustrated in FIG. 1. These temporary solutions often involve sleeves welded or otherwise fit over the riser. Other obstructions can also be present on the riser. As such, the shoulder 28 of the conventional connector 12 is problematic. This is because the shoulder 28, which is required to contain the packing seals, does not clear the temporary repairs or other obstructions on the riser. As such, a need has been developed to provide a connector for use with a riser and repair operations on a riser, which can be installed even with the obstructions or previous repairs having been done to the riser.

It is an object of the present invention to provide a connector for use in a repair of a pipeline or riser which does not have a shoulder at an end thereof.

It is another object of the present invention to provide a connector which can be used to make repairs on a riser.

It is another object of the present invention to provide a connector which is adapted for use in the splash zone.

It is yet another object of the present invention to provide a connector wherein packing seals are secured by a fastener.

It is yet another object of the present invention to provide a connector which can be installed on a riser pipe without the need for a habitat to be created to enable a weld.

It is yet another object of the present invention to provide a connector which can be used in both split and sleeved applications.

These and other objects and advantages of the present invention will become apparent from a reading of the attached specification and appended claims.

BRIEF SUMMARY OF THE INVENTION

The present invention is a connector for pipelines and risers, which can be used for the repair of pipelines and risers. The connector has a body. In an embodiment, the body has an open end. A packing and sealing flange is connected to the body. A plurality of elastomeric packing seals are provided between the body and a pipe or riser. An annulus pressure test ring is provided between pairs of the elastomeric packing seals, and a pressure test port is provided on the body of the connector. A packing and sealing reaction ring is provided at an end of the body opposite the packing and sealing flange and abuts the last of the plurality of elastomeric packing seals. An outer fastener bolt circle is provided through the packing and sealing flange. Fasteners of the outer fastener bolt circle extend through the packing and sealing flange into the body of the connector.

An inner fastener bolt circle is provided on the packing seal flange, and includes a plurality of fasteners which extend therethrough. The plurality of fasteners of the inner fastener bolt circle extend through passageways in the plurality of elastomeric packing seals, the annulus pressure test ring and the packing and sealing reaction ring. The packing and sealing reaction ring is tapped such that rotation of the plurality of bolts of the inner fastener bolt circle effectively pulls the plurality of elastomeric packing seals together so as to seal about the outer diameter of the pipe and inside diameter of the body and consequentially seals around all fasteners.

In an embodiment, each of the circular components of the connector comprise opposing halves. In this embodiment, transverse bolts are provided so as to connect opposing halves of the packing and sealing flange together.

In an embodiment, a distance between the outer diameter of the pipe and an inner diameter of the open end of the connector is greater than the outer diameter of an adjacent sleeve member of a previous repair.

The present invention is also a method of repairing a section of pipeline or rise pipe comprising use of the connector described herein.

In an embodiment, the present invention is a method of applying a connector to a pipeline or riser comprising the steps of: (a) positioning a plurality of elastomeric packing seals over the pipeline or riser, each of the plurality of elastomeric packing seals having a plurality of passageways formed therethrough; (b) positioning a packing and sealing reaction ring over the pipeline or riser, the packing and sealing reaction ring having a plurality of threaded holes formed therein, the plurality of threaded holes in alignment with the plurality of passageways of the plurality of elastomeric packing seals; (c) positioning a body over the plurality of elastomeric packing seals and the packing and sealing reaction ring, the body having a plurality of threaded holes formed therein; (d) affixing a packing and sealing flange to the body; (e) inserting a plurality of fasteners respectively through the packing and sealing flange and the passageways of the plurality of elastomeric packing seals, such that the plurality of fasteners are received by the plurality of threaded holes of the packing and sealing reaction ring; and (f) tightening the plurality of fasteners such that the packing and sealing reaction ring is pulled toward the packing and sealing flange so as to increase a pressure against the pipeline or riser.

In an embodiment, the packing and sealing flange has an outer fastener ring and an inner fastener ring each having a plurality, and the step of affixing comprises affixing the plurality of fasteners of the outer fastener ring in the plurality of threaded holes of the body.

In an embodiment, wherein each of the body, the packing and sealing flange, and the plurality of elastomeric packing seals are opposing semi-circular halves.

In an embodiment, the method further includes the step of positioning an annulus pressure test ring between pairs of the plurality of elastomeric packing seals.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 2:
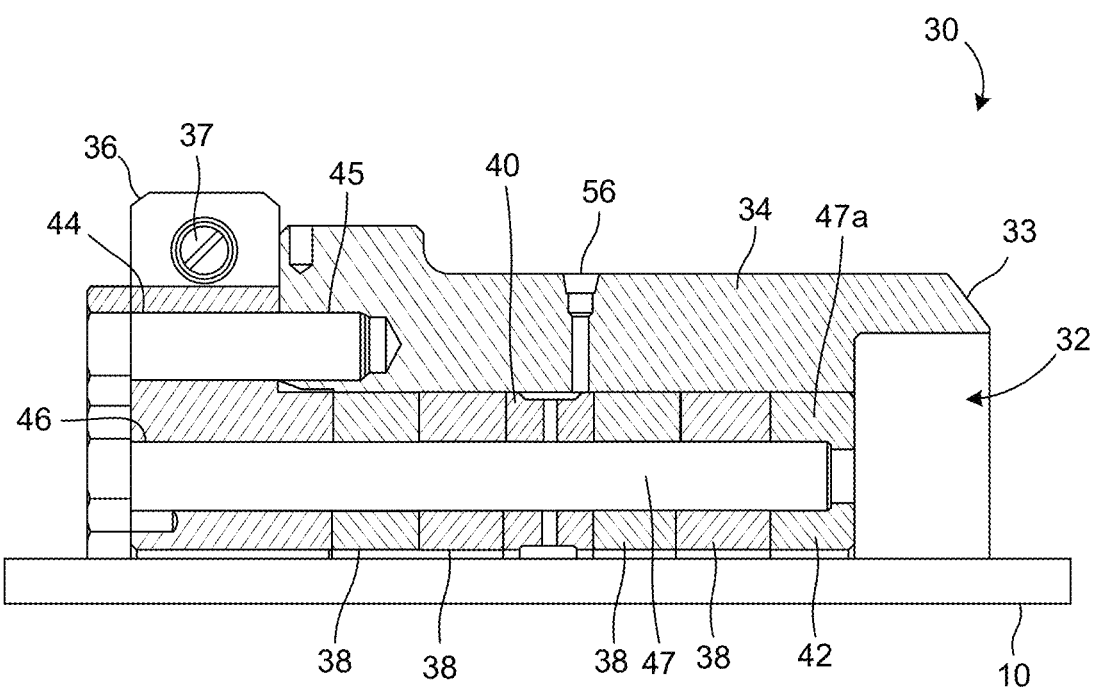
FIG. 2 is a cross-sectional view of a connector for pipelines and risers of the preferred embodiment of the present invention.

Referring to FIGS. 2-5, there is shown the connector 30 in accordance with the preferred embodiment of the present invention. The connector 30 can be used in horizontal pipeline applications or vertical riser applications, and may be used in numerous types of repair applications for each. The connector 30 is illustrated as being mounted on a pipeline or riser pipe 10. FIG. 2 is a cross-sectional view of the connector 30, and illustrates the connector 30 as having a body 34 with an open end 32. The open end 32 can be welded as another body, or an integral continuous body. The body 34 abuts and is connected to a packing and sealing flange 36.

The connector of the present invention can be used in sleeved or split applications. In a split application, the various circular components each would comprise opposing halves. In FIG. 2, it can be seen how transverse bolts or fasteners 37 are used to secure opposing halves of the packing and sealing flange 36 and body 34 together. Alternatively, the halves of the body 34 may be welded together. However, in a sleeved configuration, the circular components including the packing and sealing flange 36 would be a single piece. As such, the transverse bolts 37 would not be required or present, and nor would weld preparation. FIG. 2 also illustrates an optional weld prep 33 at the open end 32 of the body 34.

Between the inner diameter of the body 34 and the outer diameter of the pipe 10, there are provided a plurality of elastomeric packing seals 38. Specifically, FIG. 2 illustrates a first pair of the plurality of elastomeric packing seals opposite a second pair of elastomeric packing seals 38. Between these two pairs of packing seals 38 is an annulus pressure test ring 40. The annulus pressure test ring 40 is adjacent a pressure test port 56 which is formed through the body 34. Adjacent the open end 32 of the body 34, there is a packing and sealing reaction ring 42. Preferably, the packing and sealing reaction ring 42 is constructed of a metallic material such as carbon steel. In some embodiments, the pressure test ring 40 may be omitted.

An outer fastener bolt circle 44 is provided along the circumference of the packing/seal flange 36. The outer fastener bolt circle 44 comprises a plurality of fasteners 45. In FIG. 2, it can be seen how the plurality of fasteners 45 extend through bores in the packing and sealing flange 36 and into tapped bores 48 in the body 34 so as to secure the packing and sealing flange 36 to the body 34. Securing of the packing and sealing flange 36 to the body 34 can often be done at the surface prior to installation of the connector 30, or subsea depending upon the size and quantity of obstructions existing upon the pipeline or riser.

Importantly, the connector 30 of the present invention additionally has an inner fastener bolt circle 46. The inner fastener bolt circle 46 includes a plurality of fasteners 47 preferably having a threaded end. The plurality of fasteners 47 are shown extending through passageways in the plurality of elastomeric seals 38, the annulus pressure test ring 40 and the packing and sealing reaction ring 42. Conventional packing seals do not contain bores or passageways. The packing and sealing reaction ring 42 is tapped so as to have a thread (at 47a) corresponding to the thread of the fasteners 47, such that by turning the fasteners 47, the packing and sealing reaction ring 42 is used to pull the plurality of elastomeric packing seals 38 towards the packing and sealing flange 36, thus creating the requisite pressure against the pipe 10.

Figure 3:
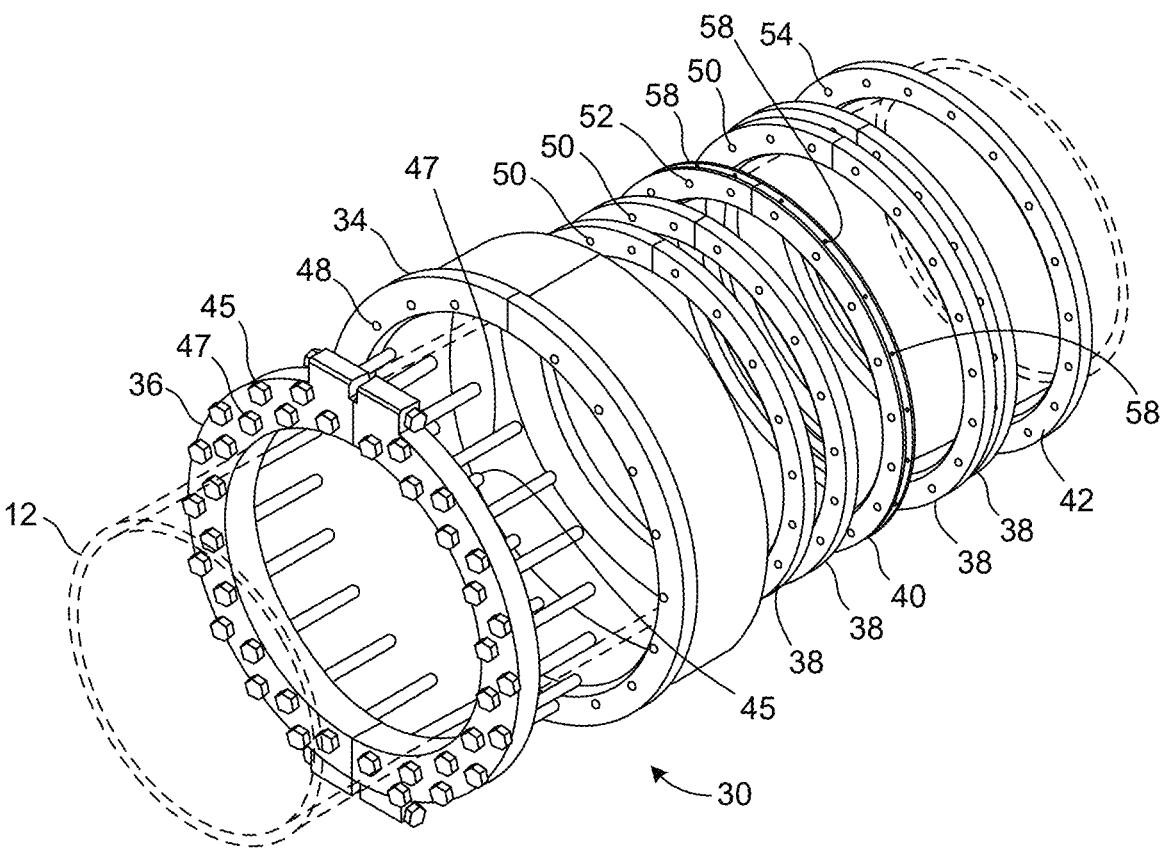
FIG. 3 is an exploded view illustrating the various components of the connector for pipelines and risers of the preferred embodiment of the present invention.

FIG. 3 illustrates an exploded view, partially transparent, of the connector 30 preferred embodiment of the present invention. In FIG. 3, it can be seen how the various elastomeric packing seals 38, the annulus pressure test ring 40, and the packing and sealing reaction ring 42 are of a smaller outer diameter than the body 34 and can be slid thereunder. FIG. 3 also illustrates the outer and inner fastener bolt circles. Importantly, it can be seen in FIG. 3 how the plurality of fasteners 47 are significantly longer than the plurality of fasteners 45, as the fasteners 47 must extend through corresponding passageways 50, 52 and 54 which are formed through the plurality of elastomeric packing seals 38, annulus pressure test ring 40 and packing/seal reaction ring 42.

FIG. 3 illustrates the split embodiment of the present invention, wherein the various pieces of the connector 30 are formed of opposing halves, or are "split". In sleeved applications, the various circular components of the connector 30 would be single pieces.

Figure 1:
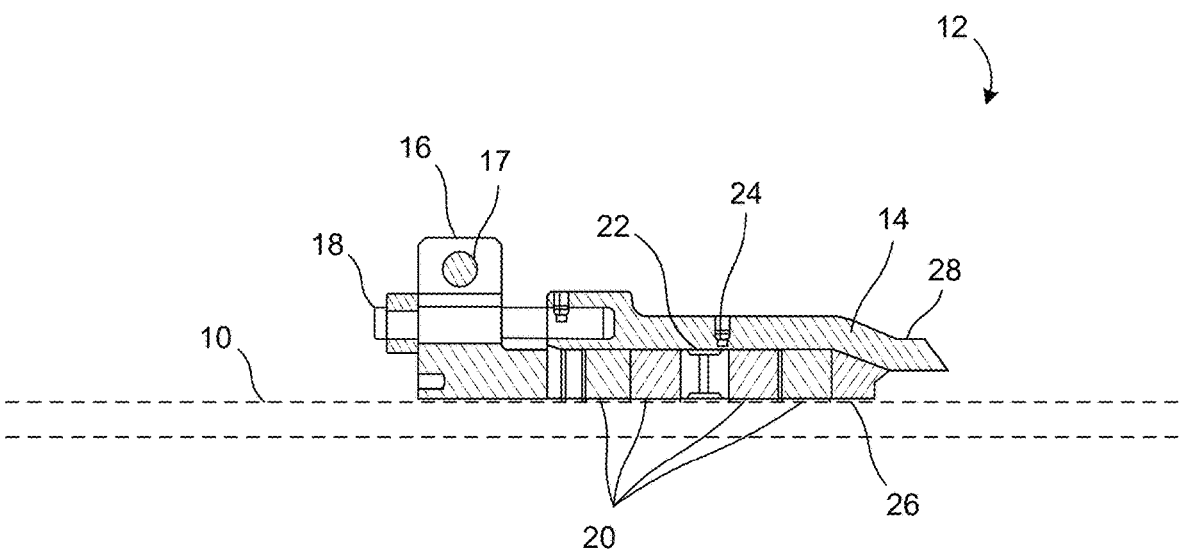
FIG. 1 is a cross-sectional view of a pipeline connector of the prior art, the connector having a shoulder at an end thereof.

FIG. 3 additionally illustrates the various communication ports 58 formed along the perimeter of the annular test ring 40. In a preferred embodiment of the present invention, the annulus pressure test ring 40 has twenty communication ports 58 formed thereon. These communication ports 58 are used to test the seal at the housing inner diameter, the pipeline or riser outer diameter and at each fastener 47 of the inner fastener bolt circle 46. In contrast to the conventional connector illustrated in FIG. 1, the connector 30 of the present invention utilizes a pulling force against the stack of elastomeric packing seals 38 rather than a pushing force and stroking associated with the conventional connector.

Figures 4, 5:
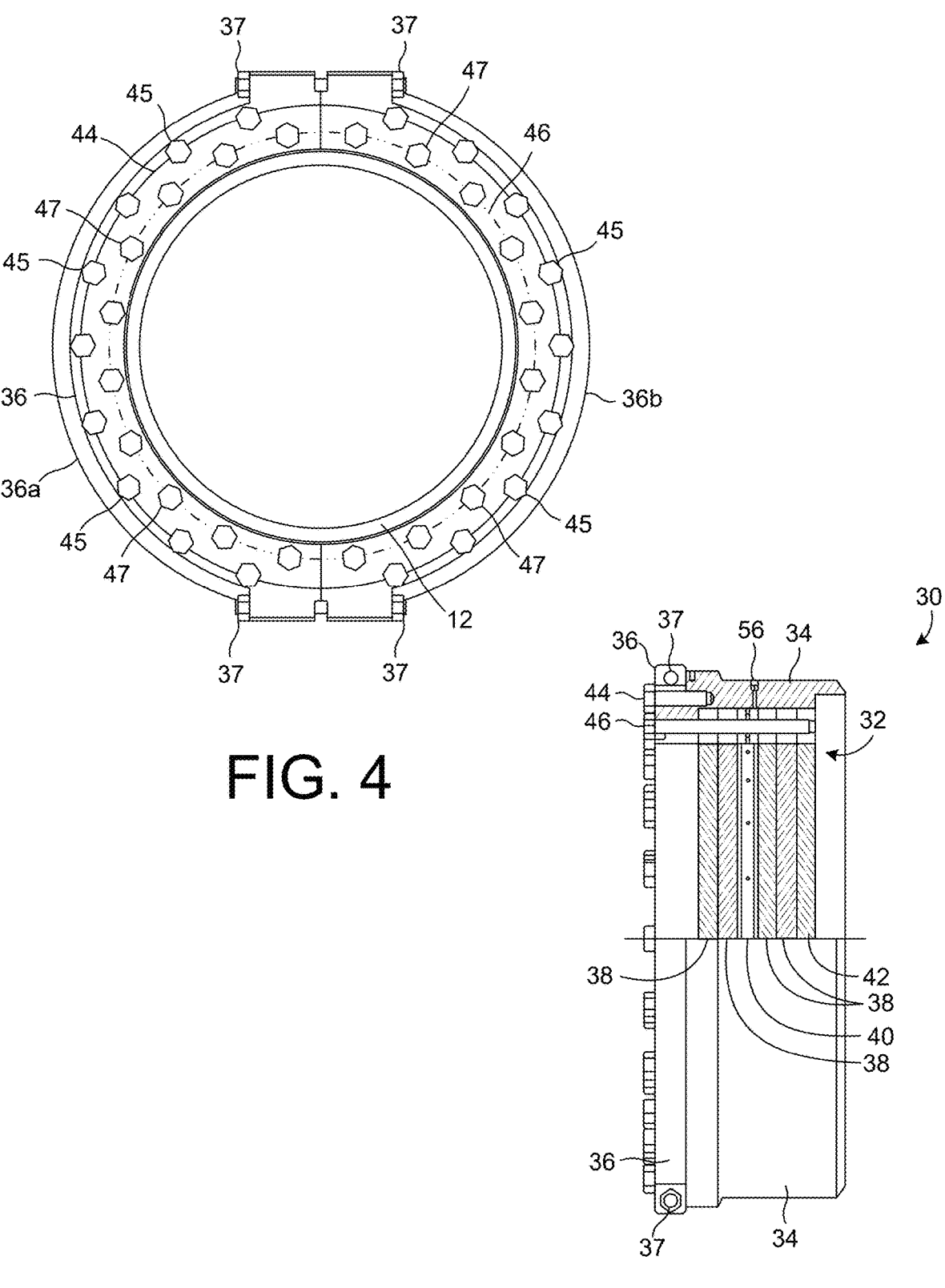
FIG. 4 is a front view of the connector for pipelines and risers of the preferred embodiment of the present invention, wherein the inner and outer fastener bolt circles are easily seen.
FIG. 5 is a side view, partially cut-away, of the connector for pipelines and risers of the preferred embodiment of the present invention.

FIG. 4 is a front view of the packing and sealing flange 36. Importantly, in FIG. 4, the layout of the outer fastener bolt circle 44, which is composed of the plurality of fasteners 45 and the inner fastener bolt circle 46, which is comprised of the plurality of fasteners 47, is easily seen. In the preferred embodiment of the present invention, the inner fastener bolt circle 46 comprises twenty fasteners 47, while the outer fastener bolt circle 44 comprises eighteen fasteners 45. The size and quantity of fasteners may vary based on pipeline or riser diameter and internal pipeline pressure. FIG. 4 also illustrates the packing and sealing flange 36 as having a first half 36a and the second half 36b, with the requisite transverse bolts 37 holding the two halves together.

FIG. 5 is a partial cross-sectional view of the connector 30 of the preferred embodiment the present invention in which the various layers of the construction of the connector 30 are more easily seen.

Referring back to FIG. 3, the a method according to the present invention can be described as including the steps of: (a) positioning a plurality of elastomeric packing seals 38 over the pipeline or riser 12, each of the plurality of elastomeric packing seals 38 having a plurality of passageways 50 formed therethrough; (b) positioning a packing and sealing reaction ring 42 over the pipeline or riser 12, the packing and sealing reaction ring 42 having a plurality of threaded holes 54 formed therein, the plurality of threaded holes 54 in alignment with the plurality of passageways of the plurality of elastomeric packing seals; (c) positioning a body 34 over the plurality of elastomeric packing seals 38 and the packing and sealing reaction ring 42, the body 34 having a plurality of threaded holes 48 formed therein; (d) affixing a packing and sealing flange 36 to the body 34; (e) inserting a plurality of fasteners 47 respectively through the packing and sealing flange 36 and the passageways of the plurality of elastomeric packing seals 38, such that the plurality of fasteners 47 are received by the plurality of threaded holes 54 of the packing and sealing reaction ring 42; and (f) tightening the plurality of fasteners 47 such that the packing and sealing reaction ring 42 is pulled toward the packing and sealing flange 36 so as to increase a pressure against the pipeline or riser 12.

The connectors according to the present invention can be used in both split and sleeve applications. For example, the connector can be used in a split, clamp application. In the clamp application, a second, opposing connector may be provided facing an opposite direction as part of the clamping device. Clamped applications are often used in scenarios where the pipe damage comprises a small section of wall loss or a pin leak.

In a sleeve application, appropriate attachment wedges or the like would be used to further secure the connector to the pipe.

In some larger pipeline/connector applications, the seal has to "jump" a radial clearance between the inner diameter of the seals and the outer diameter of the pipe, and extrusion of the seals can be an issue. For this reason, anti-extrusion guards may be employed to prevent seal extrusion. Typically, these guards are thin gauge sheet metal which is rolled into an L-shaped cross-section. The inside of the L-shaped face contacts the seal and the bottom of the L-shape contacts the pipe after setting. There are normally two guards bounding the inner and outer seals. Garter springs may be molded into the seal to add reinforcement and help prevent seal extrusion. These anti-extrusion measures may be used on conventional connectors or those of the present invention.

In riser repair, sleeve applications are often used when there is a section of damaged pipe which can be cut out. In this case, the damaged pipe section is cut out and a connector is sleeved. The connector has a spool at an end thereof. In this application, as noted, attachment wedges would likely be used. There may be other means of antiextrusion including but not limited to wedge segments which follow the radial displacement of the seals.

Due to the splash zone, conventional repairs require creation of a one atmosphere habitat in order to get the final weld in place for the repair. The present invention allows for repair of the riser without the complicated and dangerous steps required to weld a riser section to the riser. Direct welding to the riser is not necessary using the connector of the present invention.

The present invention allows for the use of modified conventional sealing elements to address applications unique to riser pipe repair, but is also applicable to repairs and connections in horizontal pipeline applications.

The connector of the present invention has been subjected to a hydrostatic annulus test that validates the sealing capacity of the connector. The test was performed on an 8" nom prototype connector to provide supporting evidence to future customers regarding the integrity of the component. The parts were machined, assembled and tested at a facility in Pennsylvania. The test was videotaped and witnessed.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A connector for pipelines and risers, which can be used for the repair of pipelines and risers, the connector comprising:
a body;
a packing and sealing flange connected to said body;
a plurality of elastomeric packing seals provided between said body and a pipe or riser, said plurality of elastomeric packing seals having a plurality of passageways formed therethrough;

an outer fastener bolt circle formed through said packing and sealing flange, said outer fastener bolt circle having a plurality of fasteners extending through said packing and sealing flange into said body;
an inner fastener bolt circle formed through said packing and sealing flange, said inner fastener bolt circle having a plurality of fasteners which respectively extend through said plurality of passageways of said plurality of elastomeric packing seals.

2. The connector of claim 1, further comprising:
an annulus pressure test ring provided between pairs of said plurality of elastomeric packing seals.

3. The connector of claim 2, further comprising:
a pressure test port provided on said body.

4. The connector of claim 2, wherein said annulus pressure test ring comprises a plurality of communication ports extending therethrough.

5. The connector of claim 1, further comprising:
a packing and sealing reaction ring positioned at an end said body opposite said packing and sealing flange and against one of said plurality of elastomeric packing seals, said packing and sealing reaction ring being tapped so as to receive said plurality of fasteners of said inner fastener bolt circle.

6. The connector of claim 1, wherein each of said body, said packing and sealing flange, and said plurality of elastomeric packing seals comprising opposing semi-circular halves.

7. The connector of claim 6, further comprising at least two transverse bolts connecting the opposing halves of said packing and sealing flanged together.

8. The connector of claim 1, wherein said body has an open end opposite said packing and sealing flange.

9. The connector of claim 8, wherein a distance between an outer diameter of the pipe and an inner diameter of said open end of the connector is greater than an outer diameter of an adjacent sleeve member of a previous repair.

10. The connector of claim 1, said plurality of fasteners of said inner fastener bolt circle comprises twenty fasteners.

11. A connector for pipelines and risers comprising:
a body;
a packing and sealing flange connected to said body;
a plurality of elastomeric packing seals provided between said body and a pipe or riser, said plurality of elastomeric packing seals having a plurality of passageways formed therethrough;
an outer fastener bolt circle formed through said packing and sealing flange, said outer fastener bolt circle having a plurality of fasteners extending through said packing and sealing flange into said body;
an inner fastener bolt circle formed through said packing and sealing flange, said inner fastener bolt circle having a plurality of fasteners which respectively extend through said plurality of passageways of said plurality of elastomeric packing seals;
a packing and sealing reaction ring positioned at an end said body opposite said packing and sealing flange and against one of said plurality of elastomeric packing seals, said packing and sealing reaction ring having threaded holes for receipt of said plurality of fasteners of said inner fastener bolt circle.

12. The connector of claim 11, wherein each of said body, said packing and sealing flange, and said plurality of elastomeric packing seals comprising opposing semi-circular halves.

13. The connector of claim 12, further comprising at least two transverse bolts connecting the opposing halves of said packing and sealing flanged together.

14. The connector of claim 11, wherein said body has an open end opposite said packing and sealing flange.

15. The connector of claim 11, wherein each of said plurality of fasteners of said inner fastener bolt circle comprises a threaded end, the threaded ends of said plurality of fasteners of said inner fastened bolt circle being respectively received by said threaded holes of said packing and sealing reaction ring.

16. The connector of claim 11, further comprising:

an annulus pressure test ring provided between pairs of said plurality of elastomeric packing seals.

17. A method of applying a connector to a pipeline or riser comprising:

positioning a plurality of elastomeric packing seals over the pipeline or riser, each of the plurality of elastomeric packing seals having a plurality of passageways formed therethrough;

positioning a packing and sealing reaction ring over the pipeline or riser, the packing and sealing reaction ring having a plurality of threaded holes formed therein, the plurality of threaded holes in alignment with the plurality of passageways of the plurality of elastomeric packing seals;

positioning a body over the plurality of elastomeric packing seals and the packing and sealing reaction ring, the body having a plurality of threaded holes formed therein;

affixing a packing and sealing flange to the body;

inserting a plurality of fasteners respectively through the packing and sealing flange and the passageways of the plurality of elastomeric packing seals, such that the plurality of fasteners are received by the plurality of threaded holes of the packing and sealing reaction ring; and tightening the plurality of fasteners such that the packing and sealing reaction ring is pulled toward the packing and sealing flange so as to increase a pressure against the pipeline or riser.

18. The method of claim 17, wherein the packing and sealing flange has an outer fastener ring and an inner fastener ring each having a plurality, the step of affixing comprising:

affixing the plurality of fasteners of the outer fastener ring in the plurality of threaded holes of the body.

19. The method of claim 17, wherein each of the body, the packing and sealing flange, and the plurality of elastomeric packing seals comprising opposing semi-circular halves.

20. The method of claim 17, further comprising:

positioning an annulus pressure test ring between pairs of the plurality of elastomeric packing seals.

\* \* \* \* \*